United States Patent
Charliac et al.

(10) Patent No.: US 12,006,893 B2
(45) Date of Patent: Jun. 11, 2024

(54) AIRCRAFT THRUST REVERSER COMPRISING A BRAKING MECHANISM FOR SLOWING A MOBILE COWL IN THE EVENT OF OVERTRAVEL

(71) Applicant: SAFRAN NACELLES, Gonfreville-L'Orcher (FR)

(72) Inventors: Fabien Charliac, Moissy-Cramayel (FR); Benjamin Brebion, Moissy-Cramayel (FR); Thomas Marlay, Moissy-Cramayel (FR); Antoine Cordiez, Moissy-Cramayel (FR)

(73) Assignee: SAFRAN NACELLES, Gonfreville-L'Orcher (FR)

( * ) Notice: Subject to any disclaimer, the term of this patent is extended or adjusted under 35 U.S.C. 154(b) by 0 days.

(21) Appl. No.: 17/632,755

(22) PCT Filed: Jul. 31, 2020

(86) PCT No.: PCT/FR2020/051418
§ 371 (c)(1),
(2) Date: Feb. 3, 2022

(87) PCT Pub. No.: WO2021/023935
PCT Pub. Date: Feb. 11, 2021

(65) Prior Publication Data
US 2022/0290632 A1   Sep. 15, 2022

(30) Foreign Application Priority Data

Aug. 5, 2019 (FR) ........................ 1908983

(51) Int. Cl.
*F02K 1/76* (2006.01)
*F02K 1/72* (2006.01)

(52) U.S. Cl.
CPC . *F02K 1/76* (2013.01); *F02K 1/72* (2013.01)

(58) Field of Classification Search
CPC ........ F02K 1/76; F02K 1/72; F05D 2260/902; E05F 5/003
See application file for complete search history.

(56) References Cited

U.S. PATENT DOCUMENTS

| 2016/0281640 A1 | 9/2016 | Loncle |
| 2018/0230939 A1 | 8/2018 | Haramburu et al. |
| 2018/0274484 A1* | 9/2018 | Ridray .................... F02K 1/763 |

FOREIGN PATENT DOCUMENTS

| DE | 20314214 U1 * | 11/2003 | .............. E05F 5/003 |
| DE | 102006040070 A1 * | 2/2008 | ................ B60J 5/06 |

(Continued)

OTHER PUBLICATIONS

KR-20190007995-A machine translation downloaded Jan. 19, 2023 (Year: 2023).*

(Continued)

*Primary Examiner* — Ted Kim
(74) *Attorney, Agent, or Firm* — Oblon, McClelland, Maier & Neustadt, L.L.P.

(57) ABSTRACT

A thrust reverser for an aircraft propulsion unit, of the type having a mobile cowl able to move between a closed position that allows the propulsion unit to generate thrust and an open position that allows the propulsion unit to generate a reverse-thrust for slowing the aircraft. The reverser includes braking elements such as a slot and a peg respectively integral with a fixed part of the reverser and with the mobile cowl. These braking elements are configured to cooperate with one another by sliding, with friction, when the mobile cowl effects an overtravel, beyond the open position, so as to generate a braking force that opposes this movement. In one preferred embodiment, the slot for this (Continued)

purpose includes a restriction in section along the direction of travel of the mobile cowl.

10 Claims, 5 Drawing Sheets

(56) References Cited

FOREIGN PATENT DOCUMENTS

| FR | 2896008 A1 | * | 7/2007 | ............... B60J 5/06 |
|---|---|---|---|---|
| FR | 2912177 A1 | * | 8/2008 | ............ E05D 13/04 |
| FR | 3 062 637 A1 | | 8/2018 | |
| JP | 2002089130 A | * | 3/2002 | ............. E05F 5/003 |
| JP | 2002339647 A | * | 11/2002 | ............. E05F 5/003 |
| KR | 20190007995 A | * | 1/2019 | ............. E05F 5/003 |
| WO | WO 2011/064479 A1 | | 6/2011 | |
| WO | WO 2015/040347 A1 | | 3/2015 | |

OTHER PUBLICATIONS

DE-20314214-U1 machine translation downloaded Jan. 19, 2023 (Year: 2023).*
JP-2002089130-A machine translation downloaded Jan. 19, 2023 (Year: 2023).*
FR-2896008-A1 machine translation downloaded Jan. 19, 2023 (Year: 2023).*
JP-2002339647-A machine translation downloaded Jan. 19, 2023 (Year: 2023).*
DE-102006040070-A1 machine translation downloaded Jan. 19, 2023 (Year: 2023).*
International Search Report dated Jan. 18, 2021 in PCT/FR2020/051418 filed on Jul. 31, 2020 (2 pages).
Preliminary French Search Report dated Apr. 28, 2020 in French Application 1908983 filed on Aug. 5, 2019 (2 pages, with Translation of Categories).

* cited by examiner

AIRCRAFT THRUST REVERSER COMPRISING A BRAKING MECHANISM FOR SLOWING A MOBILE COWL IN THE EVENT OF OVERTRAVEL

TECHNICAL FIELD

The invention relates to the field of thrust reversers for aircraft propulsion units. The invention relates more specifically to the mechanism for axially retaining the mobile external structure of such a thrust reverser.

PRIOR ART

Generally speaking, a thrust reverser can be placed in a direct jet configuration, allowing the propulsion unit to generate thrust, and in a reverse jet—or thrust reverser—configuration wherein a portion of the gases circulating in the propulsion unit is redirected towards the front of the propulsion unit, thus generating a braking counter-thrust of the aircraft.

For this purpose, thrust reversers generally comprise a mobile external structure such as a sliding cowl. In direct jet, the cowl is in a closed position so as to guide a flow of fluid in the propulsion unit, this flow fully contributing to the thrust. In reverse jet, the cowl is in an open position so as to release a radial opening configured to discharge a portion of the fluid flow from the propulsion unit, in order to generate the counter-thrust.

In a conventional thrust reverser, for example that described in document WO 2011/064479 A1, actuators such as cylinders are provided to open and close the cowl. When moving between the closed and open positions, the cowl is guided by rails or slides integral with a fixed portion of the propulsion unit.

In the event of rupture or absence of such a cowl control cylinder, the aerodynamic forces applied to the cowl during the flight phase are liable to move it beyond the open position and cause its dislocation relative to the guide rails or slides.

To prevent a too great retreat of the cowl and therefore its dislocation during operation of the thrust reverser, it is known from document WO 2015/040347 A1 to have an axial stop at least on one of the guide rails or slides.

Such a stop requires oversizing, at least locally, the structure to which it is integral, given the kinetic energy of the cowl when it collides with the stop, which tends to increase the mass of the thrust reverser as well as its cost.

DESCRIPTION OF THE INVENTION

The invention aims at providing a thrust reverser capable of retaining the mobile external structure in the event of failure or absence of an actuator controlling this structure, while avoiding the drawbacks associated with a conventional axial stop.

To this end, the object of the invention is a thrust reverser for an aircraft propulsion unit, this thrust reverser comprising a fixed structure and a mobile external structure, this thrust reverser being configured to be placed in:
 a direct jet configuration wherein the mobile external structure is in a closed position, the mobile external structure in the closed position being able to guide a flow of fluid in the propulsion unit so as to generate a thrust,
 a reverse jet configuration wherein the mobile external structure is in an open position, the mobile external structure in the open position releasing a radial opening capable of discharging a portion of said fluid flow from the propulsion unit so as to generate a counter-thrust.

The movement of the mobile external structure from the closed position to the open position defines a positive sense of movement.

The invention is characterised in that the fixed structure comprises a first braking element and the mobile external structure comprises a second braking element, the first and the second braking element cooperating with each other by sliding with friction when the mobile external structure is moved in the positive sense beyond the open position so as to generate a braking force that opposes this movement, the first and the second braking element being configured so that the braking force increases when the mobile external structure moves away from the open position.

Such a thrust reverser allows to avoid a sudden collision between the mobile external structure and the fixed structure by damping the mobile external structure when the latter performs an overtravel, by being moved in the positive sense beyond the open position under the action of aerodynamic forces, in particular in the event of breaking an actuator controlling the mobile external structure during operation of the thrust reverser in the flight phase.

Such damping of the mobile external structure reduces the weight and cost of the thrust reverser compared to a thrust reverser wherein the axial retention is provided by a conventional stop.

The invention also allows to simplify the assembly of the thrust reverser since the axial retention of the mobile external structure does not require equipping the thrust reverser with an axial stop.

In addition, the braking elements can be configured to define continuous stress paths ensuring a smooth transition between the travel of the mobile external structure upstream of the open position and its overtravel downstream of this position.

More generally, the invention allows to improve the absorption of the kinetic energy of the mobile external structure during the interruption of its travel beyond the open position and to preserve the structural integrity of the thrust reverser while avoiding oversizing the elements ensuring the axial retention of the mobile external structure.

Preferably, the first and the second braking element can be configured so that the braking force comprises at least one component perpendicular to a direction of movement of the mobile external structure.

The direction of movement of the mobile external structure corresponds to a direction along which the mobile external structure moves when the thrust reverser switches from the direct jet configuration to the reverse jet configuration.

In one embodiment, one of the first and the second braking element may comprise at least one guide element such as a slide and the other of the first and the second braking element may comprise at least one guided element such as a peg, said braking force resulting from the cooperation between the guide element and the guided element.

Thus, for example, according to a first alternative, the first braking element belonging to the fixed structure can comprise one or more slides and the second braking element belonging to the mobile external structure can comprise one or more pegs cooperating with the slide(s) so as to produce the braking force. According to a second non-limiting alternative, the first braking element belonging to the fixed structure may comprise one or more pegs and the second braking element belonging to the mobile external structure may comprise one or more slides cooperating with the peg(s) so as to produce the braking force.

Preferably, the guide element(s) (for example slides) of the first braking element (first alternative) or of the second braking element (second alternative) may be substantially parallel to the direction of movement of the mobile external structure.

The first braking element (first alternative) or the second braking element (second alternative) may for example comprise two guide elements (for example slides) substantially parallel to each other.

In one embodiment, the at least one guide element may form a slot configured to receive the at least one guided element, this slot having a dimension which varies depending on the direction of movement of the mobile external structure.

Such a variation in dimension allows to modify the frictional force between the first and the second braking element according to the relative position of the first and of the second braking element relative to each other along the direction of movement of the mobile external structure, in particular allowing to increase the braking force when the mobile external structure moves away from the closed position.

The thrust reverser may comprise first guide means configured to guide the mobile external structure between the closed position and the open position and second guide means configured to guide the mobile external structure when the latter is moved in the positive sense from the open position, these second guide means comprising the first and second braking elements.

In one embodiment, the thrust reverser may comprise a slide integral with one of the fixed structure and the mobile external structure and a sliding element integral with the other of the fixed structure and the mobile external structure, this slide forming a first slot configured to receive said sliding element, the slide forming a second slot forming one of the first and the second braking element, the second slot being configured to receive the other of the first and the second braking element.

Said sliding element may preferably form one of said first guide means and said first slot may form another of said first guide means.

In one embodiment, the braking element received by said second slot may be integral with and/or be carried by said sliding element.

The thrust reverser may comprise a stop configured to prevent movement of the mobile external structure in said positive sense beyond a stop position, the stop being configured so that the mobile external structure is subjected to said braking force when said mobile external structure is moved in the positive sense between the open position and the stop position.

When the thrust reverser comprises such a stop, one of the first and the second braking element can be configured to cooperate with the stop when the mobile external structure is moved to the stop position so as to immobilise the mobile external structure in the stop position.

In one embodiment, one of the stop and the braking element cooperating with this stop can be configured to be plastically deformed by the other of the stop and the braking element cooperating with this stop when the mobile external structure is moved to the stop position.

Such plastic deformation allows to prevent the return of the mobile external structure in the closed position.

The object of the invention is also an aircraft propulsion unit, this propulsion unit comprising a thrust reverser as defined above, as well as an aircraft comprising such a propulsion unit.

Other advantages and features of the invention will become apparent upon reading the detailed, non-limiting description which follows.

BRIEF DESCRIPTION OF THE DRAWINGS

The following detailed description refers to the appended drawings wherein.

DETAILED DESCRIPTION OF EMBODIMENTS

Figure 1:
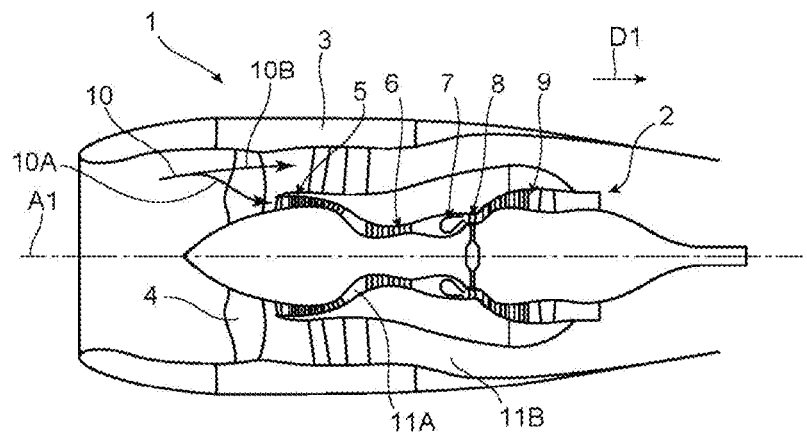
FIG. 1 is a schematic axial sectional view of an aircraft propulsion unit in accordance with the invention, this propulsion unit comprising a double-body and bypass turbojet engine.

FIG. 1 shows an aircraft propulsion unit 1 comprising a turbomachine 2 faired by a nacelle 3. In this example, the turbomachine 2 is a double-body and bypass turbojet engine.

Subsequently, the terms "upstream", "downstream", "front" and "rear" are defined relative to a sense D1 of gas flow through the propulsion unit 1 when the latter is propelled.

Conventionally, the term "direction" designates a line, generally a straight line, along which a fluid or an object can for example be moved, and the term "sense" designates an orientation of such movement, in particular along a direction.

The turbojet engine 2 has a longitudinal central axis A1 around which its various components extend, in this case, from upstream to downstream of the turbojet engine 2, a fan 4, a low pressure compressor 5, a high pressure compressor 6, a combustion chamber 7, a high pressure turbine 8 and a low pressure turbine 9. The compressors 5 and 6, the combustion chamber 7 and the turbines 8 and 9 form a gas generator.

Conventionally, during the operation of such a turbojet engine 2, an air flow 10 enters the propulsion unit 1 through an air inlet upstream of the nacelle 3, passes through the fan 4 and then splits into a central primary flow 10A and a secondary flow 10B. The primary flow 10A flows in a primary flow path 11A for the circulation of gases passing through the gas generator. The secondary flow 10B, in turn, flows in a secondary flow path 11B surrounding the gas generator and delimited radially outwards by the nacelle 3.

Figure 2:
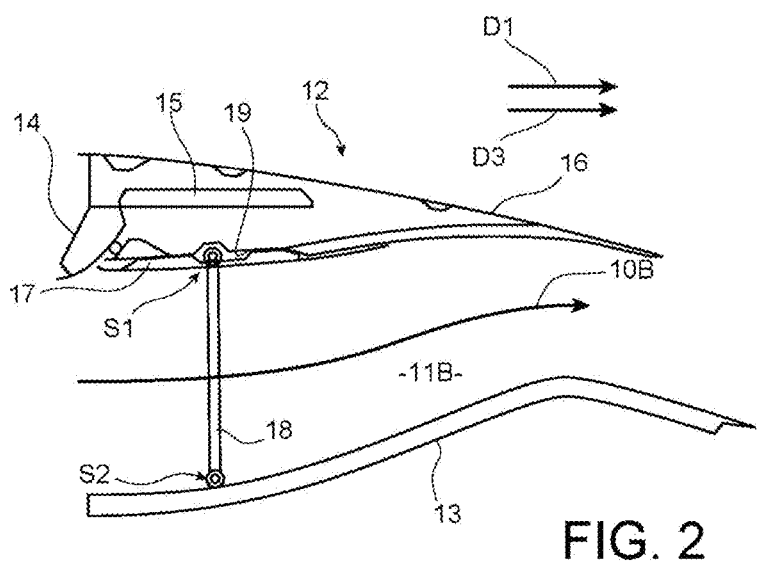
FIG. 2 is a schematic axial sectional half-view of a thrust reverser in accordance with the invention, in a direct jet configuration.
Figure 3:
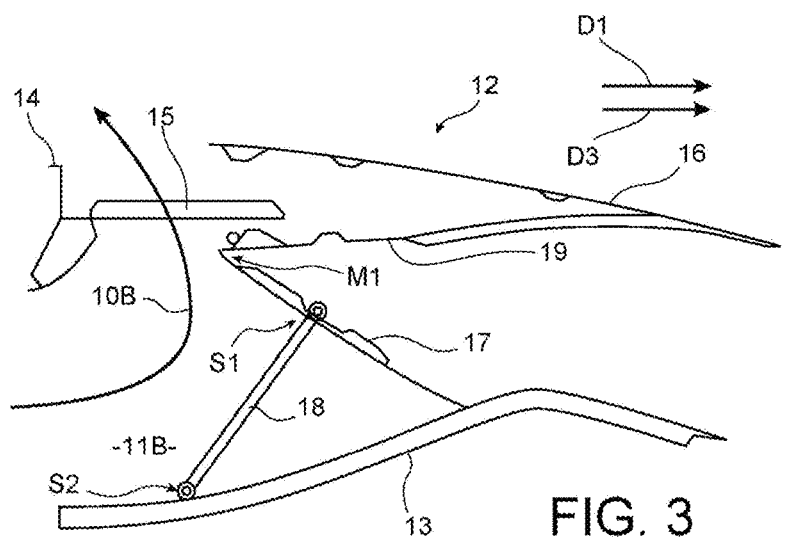
FIG. 3 is a schematic axial sectional half-view of the thrust reverser of FIG. 2, in a reverse jet configuration.
Figure 4:
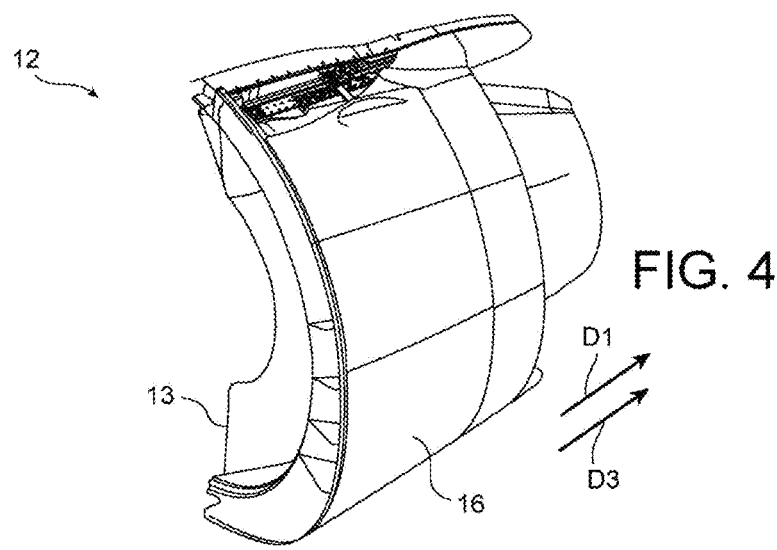
FIG. 4 is a schematic perspective view of a portion of a thrust reverser in accordance with the invention, showing a mechanism for guiding the mobile external structure of this reverser.

The invention relates to a thrust reverser 12 as illustrated in FIGS. 2 and 3, or in FIG. 4, for reversing the thrust generated by such a propulsion unit 1.

With reference to FIGS. 2 and 3, the thrust reverser 12 comprises, on the one hand, elements fixed relative to a stator of the turbojet engine 2, among which a fixed internal structure 13, a front frame 14 and cascades 15 carried by the front frame 14.

This thrust reverser 12 also comprises mobile elements relative to the aforementioned fixed elements, among which a mobile external structure 16 forming in this example a sliding mobile cowl, shutter flaps 17 and tie rods 18. These mobile elements allow to modify the configuration of the thrust reverser 12.

FIG. 2 shows the thrust reverser 12 in a direct jet configuration. In this configuration, the mobile cowl 16 is in a closed position wherein it bears axially against the front frame 14 while covering the cascades 15.

In direct jet, the mobile cowl 16 and the fixed internal structure 13 radially delimit therebetween a downstream portion of the secondary flow path 11B.

The shutter flaps 17 are in a retracted position wherein they are housed in a cavity 19 of the mobile cowl 16 so as not to close the secondary flow path 11B.

Thus, in a direct jet, the thrust reverser 12 allows to channel the secondary flow 10B towards the rear of the propulsion unit 1 so that this secondary flow 10B fully contributes to the propulsion of the aircraft.

FIG. 3 shows the thrust reverser 12 in a counter-thrust configuration, also referred to as a reverse jet. In this configuration, the mobile cowl 16 is in an open position wherein it releases a radial opening constituted in this example by openings of the cascades 15. Indeed, the axial translation of the mobile cowl 16, towards the rear of the propulsion unit 1 relative to the front frame 14, uncovers the cascades 15 which are integral with the front frame 14.

The sliding of the mobile cowl 16 from the closed position (FIG. 2) to the open position (FIG. 3) causes deployment of the shutter flaps 17 in the secondary flow path 11B. For this purpose, the shutter flaps 17 are articulated to the mobile cowl 16 at an articulation point M1 and each of the tie rods 18 is connected at a first end S1 to a respective shutter flap 17 and at a second end S2 to the fixed internal structure 13.

In reverse jet, the shutter flaps 17 are thus in a deployed position so as to deflect towards the cascades 15 a portion representing in this example substantially all of the secondary flow 10B (see FIG. 3).

In a manner known per se, the cascades 15 comprise a blading allowing to direct the secondary flow 10B passing through these cascades 15 towards the front of the propulsion unit 1.

In this thrust reversal configuration, the secondary flow 10B thus generates a braking counter-thrust of the aircraft.

To modify the configuration of the thrust reverser 12, the latter comprises actuators such as cylinders (not shown) configured to move the mobile cowl 16 between the closed position and the open position. These cylinders are in this example carried by the front frame 14 and are connected to the mobile cowl 16 so as to exert on the latter a pushing or pulling force, to move it respectively from upstream to downstream or from downstream to upstream.

Conventionally, the movement of the mobile cowl 16 from the closed position to the open position defines a positive sense of movement D3 and its movement from the open position to the closed position defines a negative sense of movement.

Figure 5:
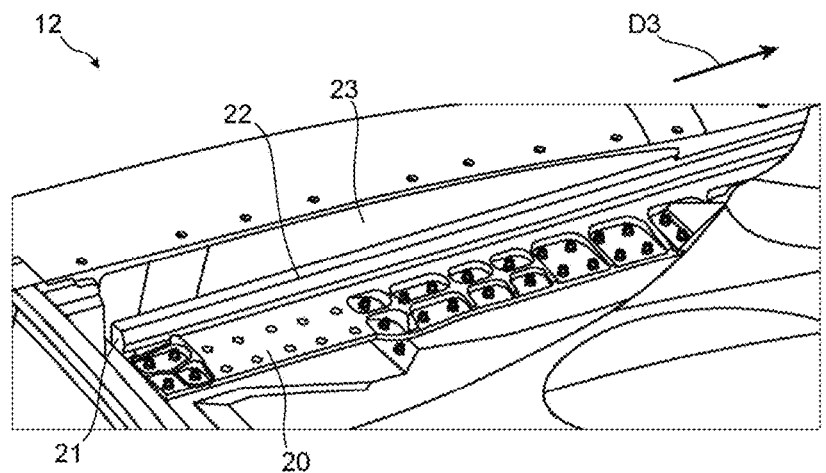
FIG. 5 is an enlargement of a portion of FIG. 4, centred on said guide mechanism.

In the embodiment of FIGS. 4 and 5, the guiding of the mobile cowl 16 during its movement between the closed and open positions is achieved by cooperation of a first slot 21 with a sliding element 20 forming in this example a rail.

The rail 20 is integral with the mobile cowl 16.

The first slot 21 is formed by a slide 22 integral with a support structure 23 which constitutes one of said fixed elements of the thrust reverser 12.

In the open position, the mobile cowl 16, cantilevered on the slide 22, is axially retained by the actuators.

Figure 6:
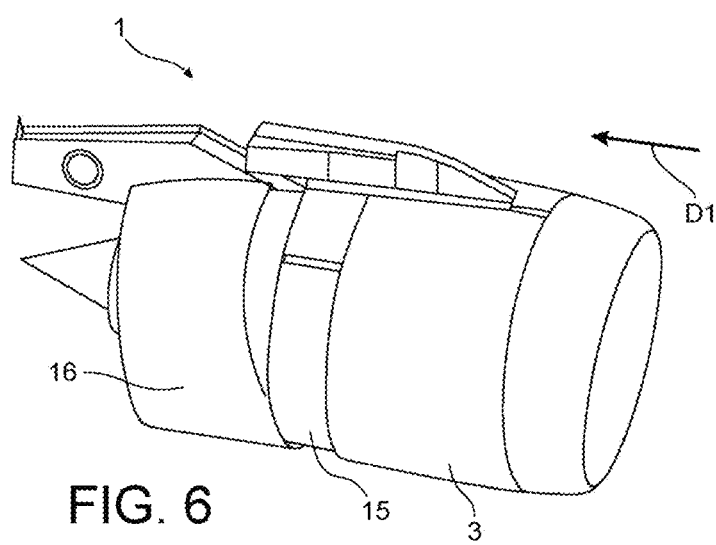
FIG. 6 is a schematic perspective view of a propulsion unit of the prior art, this propulsion unit comprising a thrust reverser whose mobile external structure is shown in a tilting position.

In a conventional thrust reverser, in particular in the event of an actuator breaking and the absence of emergency axial retention means, there is a risk of the mobile cowl 16 tilting under the action of the aerodynamic stresses to which it is subjected, and consequently a risk of the mobile cowl 16 dislocating relative to the slide 22 (see FIG. 6).

The thrust reverser 12 of the invention comprises to this end braking elements 24 and 25 as described below with reference to FIGS. 7 to 10.

Figure 7:
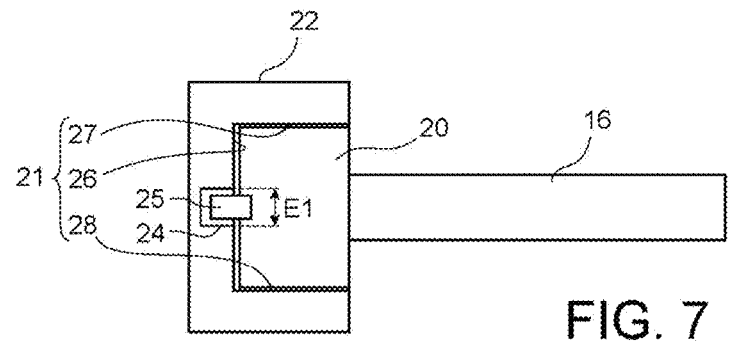
FIG. 7 is a schematic cross-sectional view of a guiding and braking mechanism of a mobile external structure of a thrust reverser in accordance with the invention, in a configuration wherein the mobile external structure is between a closed position and an open position, this mechanism comprising a peg integral with the mobile external structure received in a slot of a fixed structure of the thrust reverser.

In the example of FIG. 7, the first slot 21 of the slide 22 is delimited by a bottom face 26 and by two side faces 27 and 28 forming a U-shaped cavity. Of course, the first slot 21 may have any other shape allowing to guide the mobile cowl 16, for example a semi-circular shape.

The first slot 21 is configured to guide the rail 20 at least over a travel C1 of the mobile cowl 16 between the closed position and the open position.

Thus, when the mobile cowl 16 is moved between the closed position and the open position, the rail 20 and the first slot 21 form first means for guiding the mobile cowl 16.

The slide 22 comprises in this example a second slot 24, also U-shaped, opening onto the bottom face 26 of the first slot 21 (see FIG. 7).

In this example, this second slot 24 is configured to receive a peg 25 integral with the rail 20.

Figure 8:
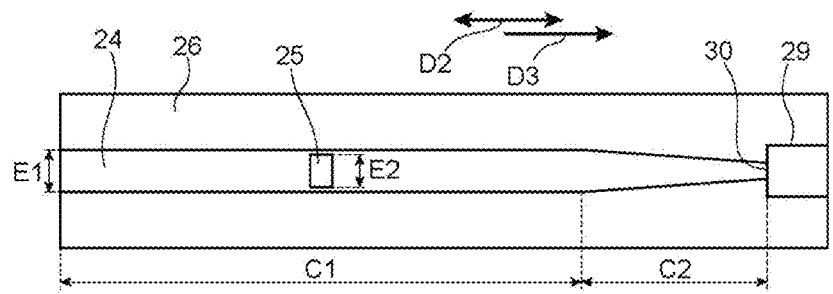
FIG. 8 is a schematic longitudinal sectional view of the mechanism of FIG. 7, showing the peg in a position wherein it does not interact with the slot, this position corresponding to a position of the mobile external structure comprised between the closed and open positions.

With reference to FIG. 8 showing the peg 25 in a configuration wherein the mobile cowl 16 is between the closed position and the open position, the second slot 24 and the peg 25 are respectively sized to allow frictionless sliding of the peg 25 in the second slot 24 over the entire travel C1 of the mobile cowl 16, that is to say when the latter is moved between the closed position and the open position (see direction D2 in FIG. 8). A slight friction of the peg 25 with the second slot 24 is however permissible, provided that this friction does not prevent the sliding of the mobile cowl 16 between the closed position and the open position.

When the mobile cowl 16 is moved in the positive sense beyond the open position, the peg 25 and the second slot 24 cooperate with each other by sliding with friction so as to generate a braking force that opposes this movement.

More specifically, the second slot 24 and the peg 25 are configured so that the braking force increases as the mobile cowl 16 moves away from the open position, in the positive sense of movement D3.

In this example, the second slot 24 has for this purpose a dimension E1 which varies according to the direction D2 of movement of the mobile cowl 16.

With reference to FIG. 8, the dimension E1 corresponds to a distance between two faces opposite each other delimiting the second slot 24, this dimension E1 being considered perpendicular to the direction D2 of movement of the peg 25 when the mobile cowl 16 is moved in the positive or negative sense.

On a first longitudinal portion of the slide 22, corresponding to the travel C1 of the mobile cowl 16 between the closed position and the open position, the dimension E1 of the second slot 24 is, on the one hand, constant along the direction D2 of movement of the peg 25 and, on the other hand, greater than the dimension E2 of the peg 25, the dimension E2 also being considered perpendicular to the direction D2 of movement of the peg 25 when the mobile cowl 16 is moved in the positive or negative sense.

On a second longitudinal portion of the slide 22, corresponding to the travel C2 of the mobile cowl 16 between the open position and a stop position (see below), also called overtravel, the dimension E1 gradually decreases so as to progressively increase the frictional force between the peg 25 and the second slot 24 when the mobile cowl 16 is moved in the positive sense between the open position and the stop position.

Figure 9:
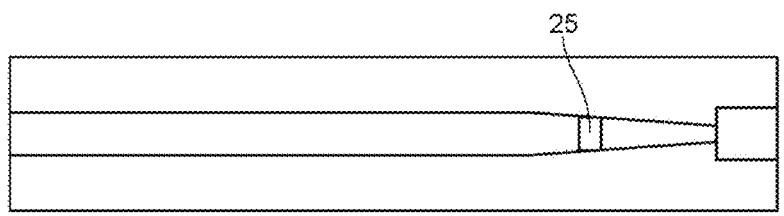
FIG. 9 is a schematic longitudinal sectional view of the mechanism of FIG. 7, showing the peg in a position corresponding to the open position of the mobile external structure.

FIG. 9 shows the peg 25 in a position wherein the mobile cowl 16 is in the open position.

Figure 10:
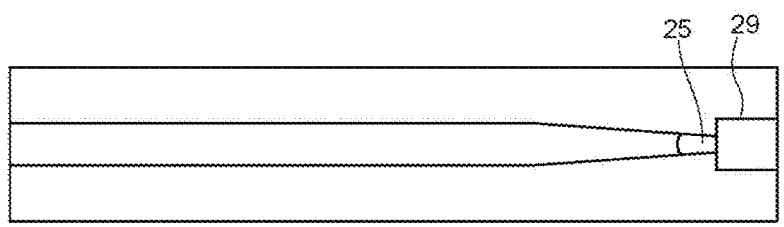
FIG. 10 is a schematic longitudinal sectional view of the mechanism of FIG. 7, showing the peg in a stop position corresponding to a position of the mobile external structure located beyond the open position.

FIG. 10 shows the peg 25 in a position wherein the mobile cowl 16 is in the stop position.

In this example, the peg 25 has elastic properties allowing it to return to its initial shape, illustrated in FIG. 8, after having undergone a deformation as illustrated in FIG. 10.

In a non-limiting manner, the peg 25 can have elastic, elastoplastic or even elasto-visco-plastic properties.

Thus, when the mobile cowl 16 is moved in the positive sense beyond the open position, the second slot 24 and the peg 25 are configured so that the braking force comprises at least one component perpendicular to the direction D2 of movement of the mobile cowl 16 and of the peg 25.

The second slot 24 and the peg 25 form second means for guiding the mobile cowl 16. Indeed, the cooperation of the second slot 24 and the peg 25 simultaneously ensures the braking and the guiding of the mobile cowl 16.

In one embodiment, the mobile cowl 16 is guided both by the first guide means 20 and 21 and by the second guide and braking means 24 and 25 when the mobile cowl 16 performs the overtravel C2.

More generally, the first slot 21 can be configured to guide the rail 20 both over all or part of the travel C1 and over all or part of the overtravel C2 of the mobile cowl 16.

In the example of FIGS. 8 to 10, the slide 22 comprises a stop 29 configured to prevent the movement of the mobile cowl 16 in said positive sense beyond the stop position, that is to say to block the mobile cowl 16 when it reaches the stop position.

This stop 29 comprises a stop face 30 perpendicular to the direction D2 of movement of the peg 25 (see FIG. 8).

Such a stop 29 is optional since the dimension E1 can be such that, at the end of the overtravel C2, this dimension prevents as such any movement of the peg 25 in the positive sense beyond the stop position. For example, the dimension E1 can be zero at the stop position.

Figure 11:
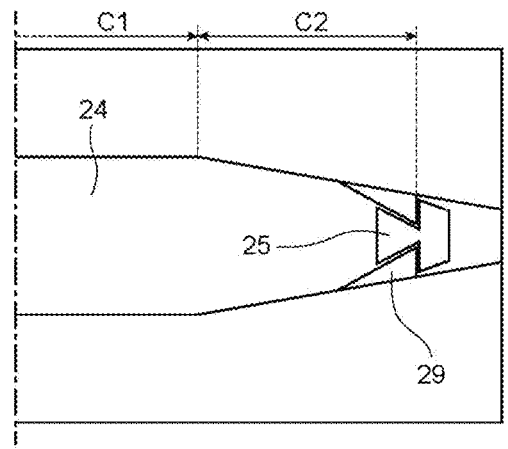
FIG. 11 is a schematic longitudinal sectional view of the mechanism of FIG. 7, showing the peg in a stop position wherein it is retained by a stop after having been plastically deformed by this stop.

FIG. 11 shows another type of stop 29 configured to plastically deform the peg 25 when the mobile cowl 16 is moved to the stop position.

In one embodiment not shown, the braking elements are structurally separate from the guide means of the mobile cowl 16. For example, said second slot 24 can be made in a part separate from the slide 22.

More generally, what has just been described is in no way limited to braking elements comprising one or more slots 24 and one or more pegs 25. The braking force can result from the cooperation of any other type of braking element, or from the cooperation of any other type of guiding and guided elements.

The mobile external structure 16 may further be a pivoting structure such as a door of a door thrust reverser.

The invention claimed is:

1. A thrust reverser for an aircraft propulsion unit, said thrust reverser comprising:
   a fixed structure; and
   a mobile external structure,
   said thrust reverser being configured to be placed in:
      a direct jet configuration wherein the mobile external structure is in a closed position, the mobile external structure in the closed position being able to guide a flow of fluid in the propulsion unit so as to generate a thrust, and
      a reverse jet configuration wherein the mobile external structure is in an open position, the mobile external structure in the open position releasing a radial opening capable of discharging a portion of said fluid flow from the propulsion unit so as to generate a counter-thrust,
   the movement of the mobile external structure from the closed position to the open position defining a positive sense of movement, wherein the fixed structure comprises a first braking element and the mobile external structure comprises a second braking element, the first and the second braking elements cooperating with each other by sliding with friction when the mobile external structure is moved in the positive sense beyond the open position so as to generate a braking force that opposes said movement, the first and the second braking elements being configured so that the braking force increases when the mobile external structure moves away from the open position;
   wherein said thrust reverser comprises a slide integral with one of the fixed structure and the mobile external structure and a sliding element integral with the other of the fixed structure and the mobile external structure, said slide forming a first slot configured to receive said sliding element, the slide forming a second slot forming one of the first and the second braking elements, the second slot being configured to receive the other of the first and the second braking elements,
   wherein said sliding element is a rail, and
   wherein said other of the first and the second braking elements is a peg integral with said rail, the peg projecting from the rail into the second slot.

2. The thrust reverser according to claim 1, wherein the first and the second braking elements are configured so that the braking force comprises at least one component perpendicular to a direction of movement of the mobile external structure.

3. The thrust reverser according to claim 1, wherein the second slot has a dimension which varies depending on a direction of movement of the mobile external structure.

4. The thrust reverser according to claim 3, wherein the dimension of the second slot corresponds to a distance between two faces opposite each other delimiting the second slot, the dimension being perpendicular to a direction of movement of the peg when the mobile external structure moves, the dimension gradually decreasing from the open position to a stop position.

5. The thrust reverser according to claim 4, wherein the peg presents elastic properties which allows the peg to return to an initial shape after being deformed when the peg is in the stop position.

6. The thrust reverser according to claim 1, wherein the first slot and the rail guide the mobile external structure between the closed position and the open position, and the second slot and the peg guide the mobile external structure when the mobile external structure is moved in the positive sense from the open position.

7. The thrust reverser according to claim 1, said thrust reverser comprising a stop configured to prevent movement of the mobile external structure in said positive sense beyond a stop position, the stop being configured so that the mobile external structure is subjected to said braking force when said mobile external structure is moved in the positive sense between the open position and the stop position.

8. The thrust reverser according to claim 7, wherein the peg cooperates with the stop when the mobile external structure is moved to the stop position so as to immobilize the mobile external structure in the stop position.

9. The thrust reverser according to claim 8, wherein one of the stop and the peg is configured to be plastically deformed by the other of the stop and the peg when the mobile external structure is moved to the stop position.

10. An aircraft propulsion unit, said propulsion unit comprising the thrust reverser according to claim 1.

* * * * *